United States Patent [19]
Van Diepenbroek

[11] 3,824,768
[45] July 23, 1974

[54] APPARATUS FOR PURIFYING A GAS

[75] Inventor: Alfred Erich Wibrandt Van Diepenbroek, Ermelo, Netherlands

[73] Assignee: Bronswerk-Apparatenbouw N.V., v/h Moring & Steenaart, Nijkerk, Netherlands

[22] Filed: July 21, 1972

[21] Appl. No.: 273,956

[30] Foreign Application Priority Data
July 26, 1971  Netherlands ..................... 7110254

[52] U.S. Cl. ................... 55/223, 55/228, 55/230, 55/257, 55/259, 261/79 A, 261/118
[51] Int. Cl. ........................................... B01d 47/06
[58] Field of Search ..................... 55/89–94, 223, 55/228, 230, 233, 257, 259, 260; 261/79 A, 118, 90, 30

[56] References Cited
UNITED STATES PATENTS

| | | | |
|---|---|---|---|
| 1,471,112 | 10/1923 | Ellis | 55/228 |
| 1,554,185 | 9/1926 | Preble | 55/228 |
| 2,668,754 | 2/1954 | Lichtenfels | 55/89 |
| 3,664,094 | 5/1972 | Barkovitz et al. | 55/228 |
| 3,713,277 | 1/1973 | Sackett, Sr. | 55/223 |

FOREIGN PATENTS OR APPLICATIONS

| | | | |
|---|---|---|---|
| 527,959 | 4/1954 | Belgium | 261/90 |

*Primary Examiner*—Bernard Nozick
*Attorney, Agent, or Firm*—Eric H. Waters

[57] ABSTRACT

Apparatus for purifying a gas, in particular air. A liquid, in particular water, is converted into a liquid mist by means of an atomizer. The gas to be purified is intimately contacted with this liquid mist whereby the impurities are transferred, at least for a major part, from the gas into the liquid mist. Hereafter the gas is contacted, together with the liquid mist containing the impurities, with liquid particles large with respect to the mist particles and adapted to combine with the liquid mist containing the impurities. Then the purified gas is separated from the liquid.

3 Claims, 3 Drawing Figures

APPARATUS FOR PURIFYING A GAS

BACKGROUND OF THE INVENTION

The invention relates to purifying a gas, in particular air, by contacting the same with a liquid, in particular with water, and particularly to an apparatus for purifying a gas, in particular air.

In a known process for removing solid, liquid and/or gaseous impurities from a gas, this gas is sprayed with a liquid. The object of this spraying step is that solid impurities, if any, will be removed from the gas by the liquid, that liquid admixtures, if any, will be adsorbed by the liquid, and that gaseous admixtures, if any, will be solved in the liquid. By separating the gas from the liquid, a purified gas is obtained. Since, in many cases, the gas to be purified contains only a limited amount of admixtures, the quantity of water to be used for the purification is, in general, much smaller than the quantity of the gas to be purified. Thus, the purification of the water will be much more economical than a dry purification of the gas.

However, the known process has the disadvantage that, mainly due to an insufficient contact between the gas and the spraying water, only a limited fraction of the impurities is removed from the gas, so that the maximum purifying effect to be obtained leaves much to be desired.

SUMMARY OF THE INVENTION

It is the main object of the invention to provide gas purification apparatus wherein said disadvantage is effectively removed.

For this purpose, according to the invention the liquid is converted into a liquid mist by means of an atomizer, and the gas to be purified is intimately contacted with this liquid mist whereby the impurities are transferred, at least for a major part, from the gas into the liquid mist, after which the gas is contacted, together with the liquid mist containing the impurities, with liquid particles large with respect to the mist particles and adapted to combine with the liquid mist containing the impurities, and the purified gas is separated from the liquid.

The expression "liquid mist" is understood to signify a mist of liquid particles having dimensions less than 20 microns, which are carried along by the gas.

The liquid mist provides an extremely large contact surface for the impurities in the gas; in addition, the distance between the mist particles and the impurities to be removed from the gas is extremely small. Thus, the liquid mist has a very great absorbing capacity for the impurities of the gas, so that an excellent purifying effect is obtained. By subsequently contacting the gas carrying the liquid mist with liquid particles large with respect to the mist particles, so that the mist particles agglomerate with the larger liquid particles, it is rendered possible in a simple manner to separate the purified gas from the liquid.

In a first embodiment according to the invention, the gas carrying the liquid mist is sprayed with liquid drops and subsequently led through a liquid separator.

As an alternative, the gas carrying the liquid mist may be led through a liquid bed in which the mist particles and the impurities are absorbed.

In a preferred embodiment according to the invention, the atomizer is constructed in such manner that the liquid mist obtains an electric potential different from the electric potential of the impurities, whereby the force of attraction between the mist particles and the impurities is, of course, increased.

Furthermore, the liquid supplied to the atomizer may be preheated, so that a portion of this liquid is evaporated and subsequently condensed during the atomizing step.

It has been found that a very good purifying action is exerted on the gas by the condensed mist particles.

The invention contemplates an apparatus for purifying a gas, in particular air, by means of the above-described apparatus. This apparatus is provided with liquid supply means, in particular for water, and is characterized by an atomizer forming a liquid mist, means for intimately contacting the gas with this liquid mist, means for contacting the gas carrying the liquid mist with liquid particles large with respect to the mist particles, and means for separating the purified gas from the liquid.

DESCRIPTION OF TWO PREFERRED EMBODIMENTS

Figure 1:
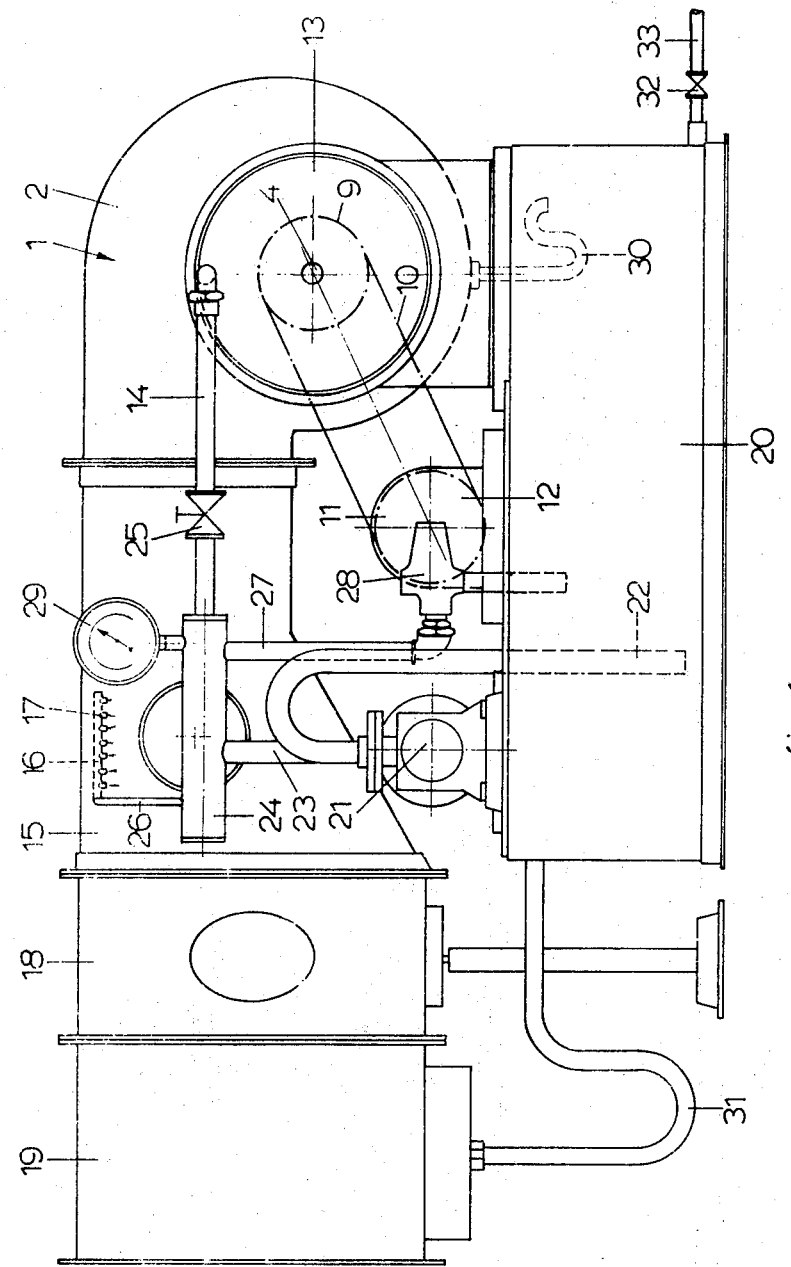
FIG. 1 is a side view of an apparatus for purifying a gas according to the invention.

FIG. 1 shows a first embodiment of the apparatus according to the invention for purifying a gas, in particular air.

This apparatus comprises an atomizing ventilator 1 with a housing 2, supporting an impeller 3 driven by a shaft 4. The impeller 3 is provided at its rear end with an end plate 5 perpendicular to the shaft 4; a small number of blades 6 are attached to this end plate. At the front side, the blades 6 are connected with a front end ring (not shown). The diameters of the end plate 5 and of the front end ring are larger than the outside diameter of the blades. Both the end plate 5 and the front end ring have sharp outside edges.

The blades 6 are further connected with a plurality of rings 7, perpendicular to the shaft 4 of the impeller 3, extending along the circumference of the impeller 3, and projecting from the blades 6; these rings are also provided with sharp outside edges.

A stationary cage consisting of round rods 8 is arranged around the blades 6 and coaxially with the shaft 4 of the impeller 3.

The shaft 4 of the impeller 3 carries a pulley 9 coupled by means of ropes 10 with a pulley 11 fixedly mounted on the shaft of a driving motor 12.

The housing 2 is provided with an intake 13 through which the gas to be purified, in particular air, is admitted. A supply pipe 14 for the liquid, generally water, leads to the intake 13 and feeds a plurality of spraying nozzles (not shown) which are arranged in the intake 13 and may be partially radially, paratially axially, and partially tangentially directed.

The incoming water is supplied, partially directly and partially indirectly via the blades 6, to the end plate 5, the front end ring and the rings 7 mounted on the blades 6, whereby the water is thrown to the outside. The water thrown away in this manner hits the round rods 8 of the cage surrounding the impeller 3, whereby the water is partially converted into a fine mist which is intimately contacted with the contaminated air and is carried along by the same. This water mist has a very large contact surface for the impurities in the air, while the distance between the mist particles and the impurities to be removed from the air is extremely small. As a consequence, substantially all impurities are transferred from the air to the water mist.

The purifying action of the water mist is further increased by the use of the above-described atomizing ventilator 1, because the electric potential of the mist particles is different from that of the impurities. In fact, the large water particles, which are immediately removed, obtain a positive charge, whereas the fine particles forming the mist are negatively charged.

Furthermore, the purifying effect of the water mist may be increased by preheating the water supplied to the pipe 14 in such manner that at least a portion of this water is evaporated and subsequently condensed during the atomizing step. It has been found that the condensed mist particles exert a very good purifying action on the air.

The pressure side of the atomizing ventilator 1 is connected with a spraying chamber 15 comprising water spraying means. In the embodiment as shown, the spraying means consist of a tube 16 provided with a large number of spraying nozzles 17 providing a coarse drop pattern.

As an alternative, the water may also be supplied to the spraying chamber 15 through a perforated plate, whereby a rain is caused to fall, as it were, in the spraying chamber 15.

In the spraying chamber 15, the mist particles carried along with the air agglomerate with the larger water drops, whereby it is rendered possible in a simple manner to separate the purified air from the water.

In the embodiment shown in FIG. 1, a water separator 19 having zigzag plates (not shown) is connected to the spraying chamber 15 through an adapter 18; in the water separator 19, the water is retained, whereas the purified air leaves the water separator at its outlet end.

As an alternative, the water separator may consist of a bed of packing bodies, for instance in the shape of small balls, this bed being continuously or periodically cleaned.

In the embodiment shown in FIG. 1, the atomizing ventilator 1 and the driving motor 12 are placed on a water tank 20, from which water is continuously supplied, by means of a pump 21, to a conduit 22. The pressure outlet 23 of the pump 21 is connected with a manifold 24, connected through a valve 25 with the supply pipe 14, and further connected with a supply pipe 26 extending into the spraying chamber 15 and communicating with the tube 16 carrying the spraying nozzles 17.

The manifold 24 is also connected with a return conduit 27 through which an amount of water adjustable by means of a control member 28 is recycled to the water tank 20. The control member 28 serves to regulate the pressure of the water supplied through pipe 14 to the atomizing ventilator 1, and through pipe 26 to the tube 16 carrying the spraying nozzles 17 in the spraying chamber 15. This pressure may be checked by means of a manometer 29.

The atomizing ventilator 1 is provided with a discharge conduit 30 through which superfluous water not carried along with the air is returned to the water tank 20. The water separator 19 has a similar discharge conduit 31 through which the water retained in the water separator is returned to the tank 20. Thus, the water is circulated in a closed circuit. If necessary, the water in the tank 20 may be periodically replenished through a conduit 33, provided with a valve 32.

Figure 2:
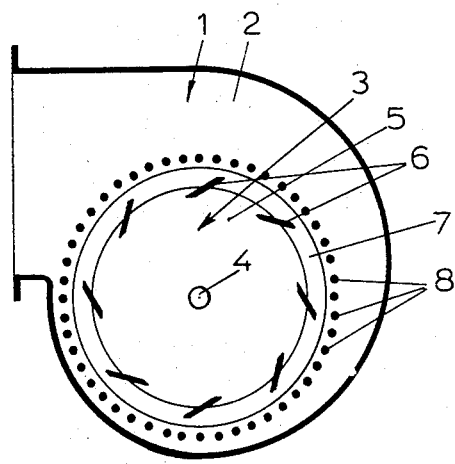
FIG. 2 is a cross section of the apparatus according to FIG. 1.

Instead of the atomizing ventilator 1 shown in FIGS. 1 and 2, it is possible to use a mist generator of a different type, for instance a compressed air atomizer, arranged in an atomizing and mixing chamber having an inlet and an outlet. The air to be purified is supplied to the inlet and is intimately contacted with the water mist in the atomizing and mixing chamber, whereby the impurities are transferred, at least for a major part, from the air to the water mist. The air leaves the atomizing and mixing chamber through the outlet, together with the water mist carrying the impurities, and is supplied to a spraying chamber 15 and a subsequent water separator 19.

Figure 3:
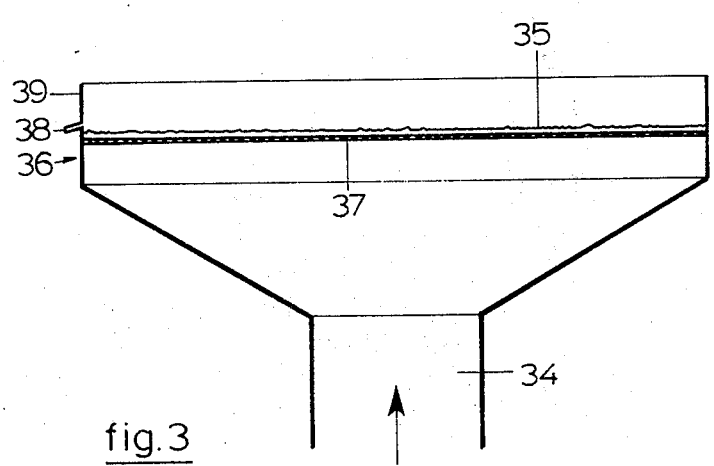
FIG. 3 is a partial cross section of a modified apparatus for purifying a gas according to the invention.

It is also possible to lead the air together with the water mist carrying the impurities, either from the atomizing ventilator 1 according to FIG. 1, or from the above-described atomizing and mixing chamber containing a compressed air atomizer or the like, through a vertical channel 34 flared at its upper end (FIG. 3) to a water bed 35 supported in a trough 36 by a perforated plate 37. In this case, the mist particles and the impurities are absorbed by the water bed 35, whereas the purified air is let through. The plate 37 may have perforations with a diameter of 1.5 mm, and the height of the water bed may be, for instance, 25 mm. Since the amount of water in the water bed is continuously increased by the absorption of the water mist, an overflow 38 may be provided in a vertical wall 39 of the trough 36, in order to keep the water bed at a constant level.

The invention is not restricted to the embodiments shown in the drawings, which may be modified in various ways within the scope of the appended claims.

I claim:

1. An apparatus for purifying a gas, in particular air, comprising an atomizer having a liquid inlet and a gas inlet and including an impeller for forming a liquid mist and for intimately contacting the gas with the liquid mist, said atomizer further including a housing in which said impeller is supported, said housing being provided with an intake serving as the gas inlet for the gas to be purified, said impeller including a driven shaft with opposite ends, an end plate perpendicularly mounted on said shaft at one end and having a sharp outside edge, a plurality of blades attached to said end plate and having an outside diameter smaller than the diameter of the plate, a plurality of rings extending perpendicular to the shaft and connected to said blades and projecting therefrom to extend along the circumference of the impeller, said rings having sharp outside edges, a stationary cage coaxially surrounding the impeller, said housing having an outlet for discharging gas carrying the liquid mist from said atomizer; a chamber coupled to the outlet of said housing for receiving the gas carrying the liquid mist, means in said chamber for providing additional liquid particles of larger size with respect to the mist particles for contacting the gas carrying the liquid mist for combining the liquid mist containing the impurities with the additional liquid particles separator means coupled with said chamber for separating the purified gas from the liquid combined with the liquid mist containing the impurities, and means for circulating the liquid in a closed circuit comprising a reservoir of liquid, and a pump connected to said reservoir for supplying liquid both to said liquid inlet of the atomizer and to said means which provides the additional liquid, said atomizer and separator means including respective drain means operatively coupled to said reservoir to return expended liquid thereto.

2. An apparatus according to claim 1 wherein said chamber in which said additional liquid is supplied is in communication with the outlet of said housing to directly receive the gas carrying the liquid mist therefrom without change of direction thereof, said separator means being connected to said chamber to directly receive the liquid combined with the liquid mist without change of direction thereof.

3. An apparatus according to claim 1 wherein said gas outlet of the housing of the atomizer and said chamber are mounted horizontally, said outlet being horizontally and tangentially directed from said housing.

* * * * *